United States Patent [19]

Burgin

[11] 4,327,298
[45] Apr. 27, 1982

[54] BATTERY BACKUP SYSTEM FOR A MICROCOMPUTER

[75] Inventor: Albert J. Burgin, Dryden, N.Y.

[73] Assignee: Borg-Warner Corporation, Chicago, Ill.

[21] Appl. No.: 103,635

[22] Filed: Dec. 14, 1979

[51] Int. Cl.³ .......................... H02J 9/06; G06F 1/00
[52] U.S. Cl. ...................................... 307/66; 364/900
[58] Field of Search ................ 307/66; 365/226, 229; 371/4; 364/200 MS File, 900 MS File

[56] References Cited

U.S. PATENT DOCUMENTS

| | | | |
|---|---|---|---|
| 3,573,483 | 4/1971 | White | 307/66 |
| 4,162,536 | 7/1979 | Morley | 364/900 |
| 4,209,710 | 6/1980 | Quarton | 307/66 |

Primary Examiner—Joseph M. Thesz
Assistant Examiner—Stephen A. Soffen
Attorney, Agent, or Firm—James E. Tracy

[57] ABSTRACT

To ensure continuous uninterrupted operation of an a-c line voltage-energized microcomputer in the event of a power failure, the line voltage is effectively sensed and in response to a substantial reduction thereof battery power is supplied to the microcomputer before such a reduction can adversely affect the operation of the microcomputer.

3 Claims, 1 Drawing Figure

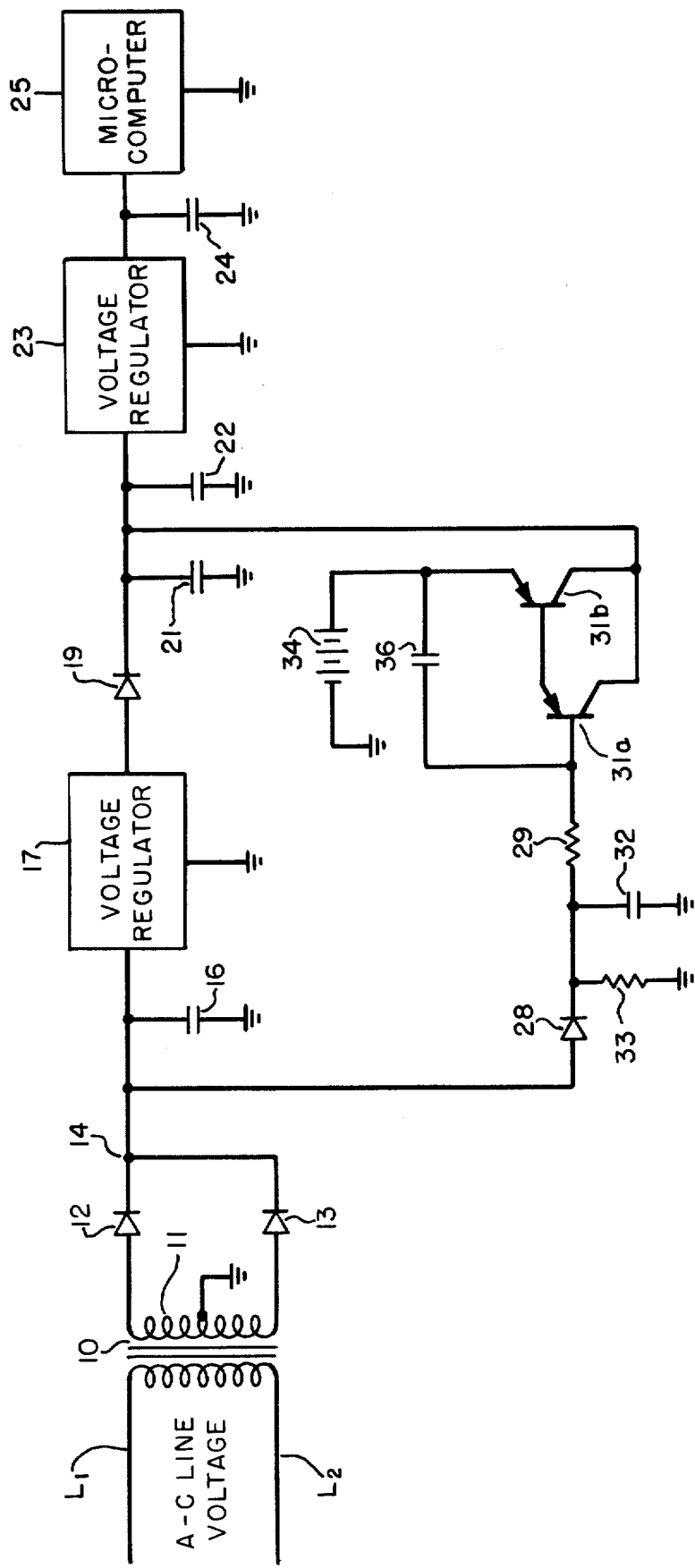

BATTERY BACKUP SYSTEM FOR A MICROCOMPUTER

BACKGROUND OF THE INVENTION

This invention relates to a battery backup circuit for maintaining uninterrupted operation of a microcomputer, which is normally energized by a-c line voltage, when a power outage or low voltage transient occurs.

An operating potential of fixed magnitude must be continuously applied to a microcomputer or microprocessor to ensure proper operation thereof. If there is a power loss, even though momentary, the operation will be deleteriously affected. For example, the memory devices may store false information that was not there originally. Moreover, when power is restored, the microprocessor could receive erroneous command signals. Hence, it is most desirable that a battery backup system, which automatically activates in response to a loss of a-c line voltage, apply battery power to the microprocessor before it adversely suffers from the line voltage loss. This is achieved by the battery backup system of the present invention, and yet the system is of relatively simple and inexpensive construction.

SUMMARY OF THE INVENTION

The battery backup system of the invention powers a microcomputer which is normally energized by a regulated d-c operating voltage received from a voltage regulator to which is applied rectified a-c voltage produced from a-c line voltage and ordinarily having an amplitude exceeding a predetermined threshold level. The system comprises a battery, a normally-off transistor having a base, an emitter and a collector, and means, including the emitter-collector conduction path of the transistor, for coupling the battery to the microcomputer. The system also comprises control means responsive to the amplitude of the rectified a-c voltage, prior to its application to the voltage regulator, for turning the transistor on in the event that amplitude drops below the predetermined threshold level, thereby applying the battery voltage to the microcomputer to maintain continuous uninterrupted operation thereof.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a battery backup system, constructed in accordance with the present invention, and the manner in which that system couples to an a-c line voltage-energized microcomputer and powers the microcomputer when there is a power outage or a substantial drop in line voltage.

DESCRIPTION OF THE ILLUSTRATED EMBODIMENT

Line conductors $L_1$ and $L_2$ provide a conventional source of single-phase a-c line voltage varying in sinusoidal fashion at a commutating frequency of 60 hertz and having a normal amplitude of around 120 volts. The a-c power line voltage is isolated and stepped down by transformer 10 having a center tap on its secondary winding 11 which tap is connected to a ground plane of reference potential or circuit common. Diodes 12 and 13 connect to secondary winding 11 to form a full-wave rectifier circuit for providing, at circuit junction 14 relative to ground, rectified a-c voltage, which, of course, is a d-c voltage. By selecting the proper turns ratio for transformer 10, the amplitude of the rectified a-c voltage or d-c voltage at junction 14 may be established at any desired level. For example, it may normally have a magnitude of around +13 volts with respect to ground.

The voltage at junction 14 is filtered by capacitor 16, to reduce the ripple component, and is then applied to a conventional voltage regulator 17 to produce an output d-c voltage having a relatively constant or regulated amplitude which is immune to any voltage fluctuations at the input of the regulator. In accordance with customary operation, the output regulated d-c voltage will be of lower amplitude than the input voltage. For example, if the input voltage is about +13 volts, the output voltage may be around +9 volts.

The regulated d-c voltage from regulator 17 is applied through isolating diode 19 to capacitors 21 and 22 for additional filtering and then to a second voltage regulator 23 for further regulation. Regulator 23 is not essential. However, the additional voltage regulation introduced by regulator 23 ensures that the d-c voltage at the regulator's output will be super-regulated and will remain fixed at a constant desired magnitude despite wide fluctuations of the a-c line voltage. The output d-c voltage from regulator 23 is subjected to further filtering by capacitor 24 before application to microcomputer 25 to effect energization thereof. As in the case of regulator 17, the output voltage of regulator 23 will be substantially less than its input voltage. For example, if the input voltage is +9 volts, the output voltage applied to microcomputer 25 may be around +5 volts. Each of capacitors 22 and 24 may have a capacitance of only 0.33 microfarads. Capacitor 21, on the other hand, preferably has a relatively large capacitance (for example, 5,000 microfarads) to enhance the filtering of the d-c operating voltage applied to microcomputer 25 and to prevent any noise signal components from reaching the microcomputer.

Turning now to the invention, the battery backup system effectively monitors the a-c line voltage and any time that voltage experiences a major drop in amplitude a battery is automatically connected to the microcomputer, and this substitution of power supplies occurs well before the drop in line voltage can cause the microcomputer to malfunction. To explain, the d-c voltage (specifically the rectified a-c voltage) at junction 14 is applied through isolation diode 28 and current limiting resistor 29 to the base of the input transistor 31a of a PNP darlington pair. Capacitor 32 provides filtering so that the base voltage on transistor 31a will be filtered d-c. Resistor 33 presents a discharge path for capacitor 32. The positive terminal of battery 34 directly connects to the emitter of the output PNP transistor 31b of the darlington pair, while the collectors of the two transistors are connected to the junction of capacitors 21 and 22. A feedback capacitor 36 is coupled from the emitter of transistor 31b to the base of transistor 31a.

Under normal conditions, the amplitude of the d-c voltage at junction 14 exceeds a predetermined threshold level. This level may, for example, be set at around +9.5 volts. Regulator 17 may be designed so that voltage fluctuations may occur above that threshold level and yet a constant amplitude operating voltage will be produced at the output of the regulator for application to microcomputer 25. As long as junction 14 is above the threshold level, transistors 31a and 31b will be reverse biased and thus turned off. In other words, when junction 14 exceeds +9.5 volts, the control voltage on the base of each transistor will be positive relative to the transistor's emitter voltage thereby rendering the transistors non-conductive or cutoff. As a consequence, when the a-c line voltage is established at its normal magnitude, microcomputer 25 will be energized by a regulated d-c operating voltage received from voltage regulator 17.

In the event of either a complete power failure or a substantial reduction in a-c line voltage, the voltage amplitude at junction 14 immediately drops below the threshold level and this lowers the base voltage (namely, the base voltage will be negative-going) on transistor 31a to the extent necessary to forward bias the base-emitter junction and drive the transistor into saturation. As transistor 31a starts to conduct, amplified negative-going base voltage is effectively applied to transistor 31b to immediately turn that transistor on and to drive it into saturation, whereupon the emitter-collector conduction path of transistor 31b provides an essentially zero-impedance connection from battery 34 to the input of voltage regulator 23. Battery power is thus delivered to microcomputer 25 substantially at the same time that the amplitude of the rectified a-c voltage at junction 14 dips below the threshold level. Of course, darlington transistors are not necessary. A single PNP transistor will suffice. A darlington is, however, faster acting, thereby minimizing the response time required to switch over to battery power.

A salient feature of the invention resides in switching over to battery power before the d-c operating voltage, produced from the a-c line voltage, is able to drop at the input of microcomputer 25 to the extent necessary to deleteriously affect the computer's operation. In effect, a reduction in input voltage to the microcomputer is anticipated and the battery power supply is activated before that reduction can actually occur. This is achieved by controlling the application of battery power in response to the rectified line voltage prior to its application to voltage regulator 17. In the operation of the regulator, there is an inherent time delay before a change in input voltage manifests in an output voltage change. Hence, when the voltage at junction 14 decreases below the threshold level, there is a finite time delay before the output voltage of regulator 17 drops. During that delay, transistors 31a and 31b will be turned on and battery 34 will be connected to the input of regulator 23. As a result, at no time will the input voltage of regulator 23 drop below the voltage range over which it can regulate and hold its output voltage at +5 volts.

While regulator 17 alone introduces a sufficient time delay to allow activation of the battery backup system without any dip in the d-c operating voltage applied to microcomputer 25, the 5,000 microfarad capacitor 21 provides a long time constant and also delays or slows down any drop in amplitude of the operating voltage to ensure that battery power will be supplied to the microcomputer before that amplitude can decrease sufficiently to deleteriously affect the operation of the microcomputer. Moreover, regulator 23, while enhancing and improving the regulation of the d-c operating voltage, also introduces an additional delay in any reduction of the d-c operating voltage in response to a drop in amplitude of the rectified a-c voltage at junction 14, thereby further ensuring that battery power will be activated well before the microcomputer can be adversely affected by a decrease in a-c line voltage.

Capacitors 32 and 36 facilitate a smooth transition from line voltage produced power to battery power. Diode 19 prevents battery current from draining through voltage regulator 17.

The invention provides, therefore, a unique and relatively inexpensive battery backup system capable of automatically becoming operable to feed battery voltage to a microcomputer long before its normal input operating voltage, produced from a-c line voltage, will drop as a result of a power failure or a major voltage sag or low voltage transient.

While a particular embodiment of the invention has been shown and described, modifications may be made, and it is intended in the appended claims to cover all such modifications as may fall within the true spirit and scope of the invention.

I claim:

1. A power supply system for providing uninterrupted d-c power for a microcomputer, comprising:
   a source of a-c line voltage;
   a full-wave rectifier coupled to said line voltage source for developing rectified a-c voltage normally having an amplitude exceeding a predetermined threshold level;
   a voltage regulator coupled to the output of said full-wave rectifier for producing, from the rectified a-c voltage, a regulated d-c operating voltage having a relatively constant amplitude, the operation of said voltage regulator exhibiting a finite time delay before a change in input voltage results in an output voltage change;
   coupling means for coupling the output of said voltage regulator to the microcomputer to normally effect energization of the microcomputer in response to the regulated d-c operating voltage;
   a battery;
   a normally-off PNP darlington transistor pair having base, emitter and collector terminals;
   means, including the conduction path between the emitter and collector terminals of said PNP darlington transistor pair, for coupling said battery to the microcomputer;
   monitoring means for sensing the rectified a-c voltage at the output of the full-wave rectifier, and prior to the application of that voltage to the input of said voltage regulator, to produce a control voltage having an amplitude which is directly proportional to the amplitude of the rectified a-c voltage;
   means for applying the control voltage to the base terminal of said PNP darlington transistor pair to immediately turn said transistor pair on in the event that the amplitude of the rectified a-c voltage falls below the predetermined threshold level, whereupon the battery voltage is applied to the microcomputer before the drop in the rectified a-c voltage can manifest in a voltage change at the output of the voltage regulator thereby to maintain continuous uninterrupted operation of the microcomputer;
   and a feedback capacitor coupled from the emitter terminal to the base terminal of the darlington transistor pair to facilitate a smooth transition during a switch over from a-c line voltage produced power to battery power.

2. A power supply system according to claim 1 wherein a capacitor, having a relatively large capacitance, is coupled across the output of said voltage regulator for enhancing the filtering of the d-c operating voltage received from the regulator and for also delaying any drop in amplitude of the d-c operating voltage to further ensure that battery power will be supplied to the microcomputer well before that amplitude can decrease sufficiently to deleteriously affect the operation of the microcomputer.

3. A power supply system according to claim 1 wherein a second voltage regulator is included in said coupling means and is inserted in series between the aforementioned voltage regulator and the microcomputer to enhance the regulation of the d-c operating voltage applied to the microcomputer, said second voltage regulator introducing an additional delay in the reduction of the d-c operating voltage in response to a drop in amplitude of the rectified a-c voltage, thereby further ensuring that battery power will be activated well before the microcomputer can be adversely affected by a decrease in a-c line voltage, and wherein the battery voltage, when said darlington transistor pair is turned on, is applied to the input of said second voltage regulator.

* * * * *